United States Patent [19]

Weeks

[11] 4,338,150
[45] Jul. 6, 1982

[54] METHOD FOR MAKING ARTICLES BY RADIO FREQUENCY WELDING

[75] Inventor: Brian Weeks, Epsom, England

[73] Assignee: The British Petroleum Company Limited, London, England

[21] Appl. No.: 197,789

[22] Filed: Oct. 17, 1980

[30] Foreign Application Priority Data

Oct. 24, 1979 [GB] United Kingdom ............... 7936835

[51] Int. Cl.$^3$ ............................................ B29C 19/02
[52] U.S. Cl. ................................ 156/275.5; 156/337; 156/333
[58] Field of Search ............... 156/273, 337, 333, 272

[56] References Cited

U.S. PATENT DOCUMENTS 3,321,357  5/1967  Kennedy ........................... 156/337
3,336,173  8/1967  Renfroe ............................. 156/273

FOREIGN PATENT DOCUMENTS 2010085  6/1979  United Kingdom .

*Primary Examiner*—George F. Lesmes
*Assistant Examiner*—B. K. Johnson
*Attorney, Agent, or Firm*—Brooks, Haidt, Haffner & Delahunty

[57] ABSTRACT

Surfaces of a blend of (1) unvulcanized chlorosulphonated polyethylene and/or chlorinated polyethylene, (2) a bituminous petroleum derivative of softening point in excess of 100° C. and an asphaltene content in excess of 25% by weight and (3) a noninterfering antiblocking agent are joined by radio frequency dielectric welding.

11 Claims, No Drawings

METHOD FOR MAKING ARTICLES BY RADIO FREQUENCY WELDING

The present invention relates to a method of joining sheets formed from mixtures of chlorosulphonated polyethylene, chlorinated polyethylene and bituminous materials.

It is often desirable to fabricate articles from sheets of flexible polymeric material by joining together different sheets or different portions of the same sheet. This may be done by the use of adhesives or in certain cases by the use of heat welding. This method however is not always suitable and in particular it cannot be satisfactorily applied to vulcanised or cross-linked materials.

GB 2010085 discloses an elastomeric cushioning device which may be formed from two sheets of elastomeric material by welds. These welds may be formed by radio frequency heating. The specification alleges that various materials may be used to form the sheets including chlorinated polyethylene and chlorosulphonated polyethylene. The preferred material however is polyurethane.

Chlorosulphonated and chlorinated polyethylene are expensive materials and it is desirable to incorporate fillers into the polymer. It is desirable to use fillers which do not unduly adversely affect the properties of the resulting product. Some fillers may in fact improve certain properties. Thus carbon black can improve the strength of articles made from chlorosulphonated and/or chlorinated polyethylene. For this reason sheets of chlorosulphonated polyethylene which are available commercially contain carbon black filler. Such commercially available sheets cannot be satisfactorily joined by radio frequency welding and it was therefore believed that filled or extended chlorine-containing synthetic elastomers cannot be satisfactorily welded by radio frequency heating.

We have now found that by using a specific filler or extender high levels of filler or extender can be incorporated into synthetic chlorine-containing elastomers without adversely affecting the ability of the resulting material to be radio frequency welded.

According to the present invention a method of joining together surfaces constituted by a blend comprising (1) unvulcanised chlorosulphonated polyethylene and/or chlorinated polyethylene, (2) a bituminous petroleum derivative of softening point in excess of 100° C. and an asphaltene content in excess of 25% by weight and (3) a non-interfering anti-blocking agent, which comprises bringing the surfaces to be joined into contact and subjecting them to radio frequency dielectric welding.

The blend of unvulcanised chlorosulphonated polyethylene and/or chlorinated polyethylene, a bituminous petroleum derivative of softening point in excess of 100° C. and an asphaltene content in excess of 25% by weight, and a non-interfering blocking agent is referred to throughout this specification as the "RF weldable blend" for convenience.

Chlorosulphonated polyethylene elastomers are made by treating polyethylene with chlorine and sulphur dioxide to give a product containing —Cl and —$SO_2$Cl groups. Chlorosulphonated polyethylene elastomers are commercially available under the trade name "Hypalon" from E I DuPont de Nemours & Co. Inc. Information on these polymers is given in Volume 7, page 6, line 5, of "Encyclopaedia of Chemical Technology" edited by Kirk-Othmer, Second Edition.

Chlorinated polyethylene elastomers are made by treating polyethylene with chlorine. The chlorinated polyethylene may, for example, have a chlorine content of from 20 to 48% by weight.

It is preferred to use chlorinated polyethylene based on high density polyethylene having chlorine contents of from 25 to 40% by weight chlorine. Particularly preferred are chlorinated polyethylene CPE 2552 and CPE 3614A which contain 25% and 36% by weight chlorine respectively and which are manufactured by Dow Chemical Company.

In addition to the chlorosulphonated and chlorinated polyethylene, the blends used in the present invention contain a bituminous petroleum derivative. This petroleum derivative has a softening point in excess of 100° C. (as determined by the ring and ball test described in Chapter 13, page 12, of "Petroleum Products Handbook" edited by Guthrie and published in 1960 by McGraw Hill). The asphaltene content is in excess of 25% weight.

Various petroleum derivatives are available which have characteristics similar to bitumen and which have the required softening point and asphaltenes content. They include certain blown bitumens, i.e. bitumens which have been modified by blowing in air at elevated temperatures and blown propane precipitated asphalt. However it is preferred to use "hardened extract". Hardened extracts are defined, and the difference between hardened extract and bitumen explained in our co-pending application Ser. No. 04436/77 (case 4317), corresponding to Belgian Pat. No. 863 660 the disclosure of which is incorporated by reference.

The blend contains a non-interfering blocking agent. Blocking agents are materials which are added to polymer articles to prevent adjacent surfaces adhering together, for example, when sheets of polymer are stored in contact with one another. It has been found that certain blocking agents, for example, talc, when applied to the surfaces to be bonded interfere with the radio frequency dielectric welding step. It is particularly preferred to use long chain fatty acid amide, for example, an amide of a $C_{10}$ to $C_{20}$ fatty acid, as an anti-blocking agent. It is particularly preferred to use stearamide.

The relative amounts of different components of the blend may vary over a moderately wide range.

Thus the chlorosulphonated polyethylene and/or chlorinated polyethylene may, for example, form 20 to 75% wt, preferably 20 to 70% wt of the total weight of the blend, more preferably 40 to 50% wt.

The weight ratio of chlorosulphonated polyethylene to chlorinated polyethylene when both are present may, for example, be in the range 1:9 to 4:1, more preferably 1:4 to 2:1, for example 1:1.

The blend may also contain other ingredients providing these do not interfere with the radio frequency weldability of the blend. Thus the blend may contain particulate fillers such as carbon black. Such particulate fillers may, for example, constitute up to 30% wt, preferably 5 to 25% wt of the blend.

The blend may also contain long chain aliphatic amines which facilitate the formation of sheets from the blend.

Radio frequency dielectric welding is a well known technique with polymers such as polyvinyl chloride and any of the methods well known in the art may be used.

The surfaces to be joined by the method of the present invention may consist of surfaces of one or more sheets consisting of homogeneous mixtures based on the RF weldable blend.

Alternatively the surfaces to be joined may be the surfaces of composite sheets. Thus the process of the present invention may be applied to a sheet incorporating a layer of a reinforcing fabric, for example, a scrim (i.e. open mesh fabric), of natural or synthetic fibres.

The process of the present invention may be applied to composite sheets containing a layer of a rubber proofed fabric. Such rubber proofed fabrics may be made by spreading a rubber paste on the fabric. The rubber may be vulcanised or the fabric may be used with the rubber unvulcanised. Preferably the rubber is vulcanised. One or more sheets formed from the RF weldable blend may then be plied onto the rubberised fabric.

The process of the present invention may be applied to composite sheets in which only one face is constituted by the RF weldable blend, the other face being, for example, fabric. The RF weldable blend allows articles to be fabricated from the composite sheet by radio frequency dielectric welding while decorative or protective coatings can be applied, e.g. by spray painting to the fabric face.

It is a particularly useful feature of the present invention that not only is the RF weldable blend weldable to itself it can also be radio frequency welded to vinyl chloride or urethane polymers.

The process of the present invention may be used to fabricate a variety of useful articles. In particular it may be used to produce inflatable articles such as inflatable dinghies, buoyancy bags, dunnage bags and inflatable roller bags.

The ability to radio frequency weld the RF weldable blend to vinyl chloride and urethane polymers is particularly valuable because it enables fittings, such as valves, required on inflatable articles to be easily and cheaply joined to the main body of the inflatable article.

The reference will now be illustrated by reference to the following examples.

EXAMPLE 1

A membrane of thickness 1.2 mm was prepared from a mixture of the following composition.

| | |
|---|---|
| Chlorosulphonated polyethylene (Hypalon 45) | 22.1% (by weight) |
| Chlorinated polyethylene (3614A) | 22.1 |
| Bituminous petroleum derivative with softening point of 120° C. and asphaltene content above 25% wt (HE resin 120) | 37.5 |
| MT carbon black | 17.7 |
| Octadecyclamine | 0.4 |
| Stearamide | 0.2 |

The HE Resin 120 was manufactured from a mixture of PPA (propane precipitated asphalt) and an aromatic process oil (sold by British Petroleum as "Enerflex" 65) by blowing with air at elevated temperatures.

Two surfaces of the membrane were brought into contact and welded together using a Radyne FW4A/35CW radio frequency welder at 27.12 MHz with a maximum output of 3.5 KW. A dwell time of 4 seconds in the welder gave a satisfactory 300 mm×5 mm weld.

EXAMPLE 2

A membrane was prepared as in Example 1 except that the thickness was 0.8 mm. Two surfaces of the membrane were brought into contact and welded together using an Acme No. 4 HF welder (HF Industrial Services Limited) at 56 MHz with a maximum power output of 3.5 KW. A dwell time of 5 seconds gave a satisfactory 300 mm×5 mm weld.

The above examples illustrate radio frequency welding of blends containing stearamide. It is believed that the use of blends containing oleamide may give particularly satisfactory results when subjected to radio frequency welding.

COMPARATIVE TEST A

A membrane was prepared as in Example 1 but consisting only of chlorosulphonated polyethylene. The composition is given in the Table.

The suitablity of the membrane for radio frequency welding was assessed by applying a 200 mm×3 mm welding bar and a Radyne FW4A/35CW welder with a maximum output of 3.5 KW at 27.12 MHz and measuring the power absorbed. The results are given in the Table.

COMPARATIVE TEST B

An experiment was carried out as in Comparative Test A but using chlorosulphonated polyethylene containing 28.6% of other material, namely carbon black.

COMPARATIVE TEST C

An experiment was carried out as in Comparative Test B but with 50% of carbon black.

EXAMPLE 3

An experiment was carried out as in Comparative Test B but replacing the carbon black by a bituminous petroleum derivative HE Resin 140 of softening point in excess of 100° C. and asphaltene content in excess of 25% wt/wt.

EXAMPLE 4

An experiment was carried out as in Comparative Test B but incorporating in the membrane an additional quantity of extender, namely HE Resin 140.

COMPARATIVE TEST D

As Comparative Test A but using chlorinated polyethylene in place of chlorosulphonated polyethylene.

COMPARATIVE TEST E

As Comparative Test B but using chlorinated polyethylene.

EXAMPLES 5 and 6

As Examples 3 and 4 respectively but using chlorosulphonated polyethylene.

The results given in the Table show the reduction in power input which takes place when quite small quantities of carbon black filler are incorporated into chlorosulphonated and chlorinated polyethylene. The reduction is particularly pronounced for chlorosulphonated polyethylene. The Table shows that when the sole filler or extender is carbon black the incorporation of 50% by weight of filler or extender leads to degradation of the product during radio frequency welding.

However when the bituminous resin is incorporated over 50% of filler or extender can be incorporated without impairing the radio frequency weldability.

The greater the amount of power which is absorbed by the blend, the more efficient will be the radio frequency welding.

TABLE

| Experiment | Parts by weight | | | | | % wt Black | % wt Total Extender | Power Input KW |
| --- | --- | --- | --- | --- | --- | --- | --- | --- |
| | CPSE | CPE | Black | HE Resin | ABA | | | |
| A | 100 | — | — | — | — | 0 | 0 | 3.0 |
| B | 100 | — | 40 | — | — | 28.6 | 28.6 | 2.1 |
| C | 100 | — | 100 | — | — | 50.0 | 50.0 | 1.9* |
| 3 | 100 | — | — | 40 | 1 | 0 | 28.4 | 3.2 |
| 4 | 100 | — | 40 | 85 | 1 | 17.7 | 55.3 | 2.9 |
| D | — | 100 | — | — | — | 0 | 0 | 2.9 |
| E | — | 100 | 40 | — | — | 28.6 | 28.6 | 2.6 |
| 5 | — | 100 | — | 40 | 1 | 28.4 | 28.4 | 2.9 |
| 6 | — | 100 | 40 | 85 | 1 | 17.7 | 55.3 | 2.9 |

*blend degraded.
CPSE is a chlorosulphonated polyethylene sold under the trade name Hypalen 45 by E I duPont de Nemours.
CPE is a chlorinated polyethylene sold under the designation 3614A by Dow Chemical Company.
Black is carbon black Type MT.
HE Resin is a bituminous resin HE140 similar to that used in Example 1 but with a higher softening point.
ABA is octadecylamine anti-blocking agent.

I claim:

1. A method of joining together surfaces constituted by a blend comprising (1) unvulcanized chlorosulphonated polyethylene and/or chlorinated polyethylene, (2) a bituminous petroleum derivative of softening point in excess of 25% by weight, and (3) a long chain fatty acid amide as a non-interfering blocking agent, which comprises bringing the surfaces to be joined into contact and subjecting them to radio frequency dielectric welding.

2. A method according to claim 1 wherein the chlorosulphonated and/or chlorinated polyethylene together are 20 to 75% by weight of the blend.

3. A method according to claim 2 wherein the chlorosulphonated and/or chlorinated polyethylene together are 20 to 70% by weight of the blend.

4. A method according to claim 3 wherein the chlorosulphonated polyethylene and/or chlorinated polyethylene are together 40 to 50% by weight of the blend.

5. A method according to claim 1, 2, 3 or 4 wherein the blend contains from 0 to 30% by weight of carbon black.

6. A method according to claim 4 wherein the blend contains from 5 to 25% by weight of carbon black.

7. A method according to claim 1 wherein the blend contains an amide of a fatty acid having 10 to 20 carbon atoms in the molecule.

8. A method according to claim 2 wherein the blend contains a mixture of chlorosulphonated and chlorinated polyethylene.

9. A method according to claim 8 wherein the weight ratio of chlorosulphonated polyethylene to chlorinated polyethylene is in the range 1:9 to 4:1.

10. A method according to claim 9 wherein the weight ratio is in the range 1:4 to 2:1.

11. A process according to claim 1, 2, or 8 wherein the long chain fatty acid amide is stearamide.

* * * * *